Figure 1:
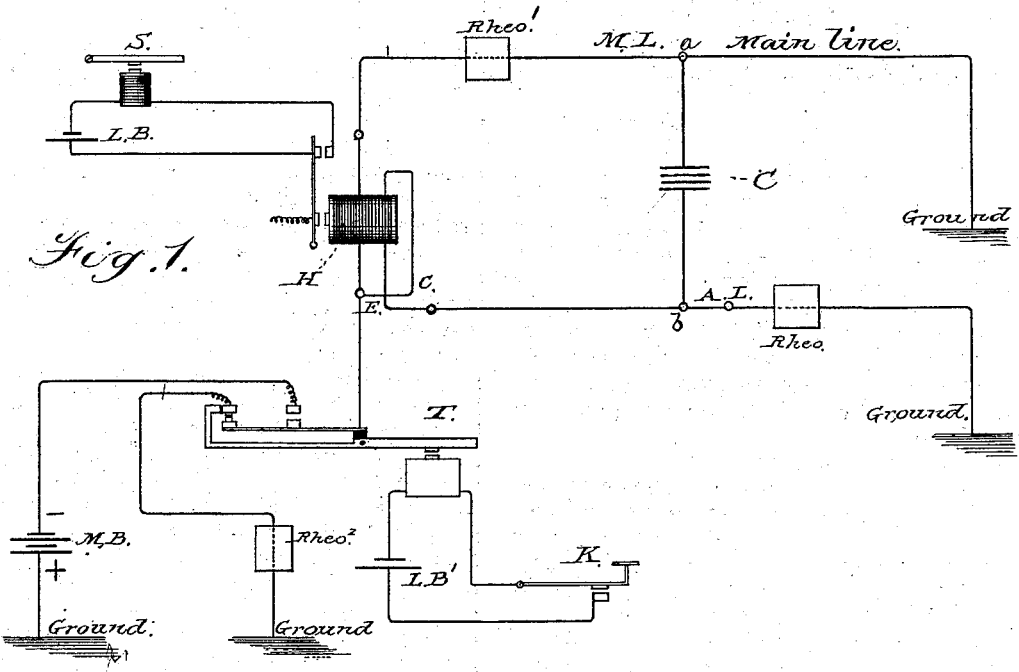

(No Model.)

B. THOMPSON.
CONDENSER FOR TELEGRAPHIC CIRCUITS.

No. 268,317. Patented Nov. 28, 1882.

Witnesses
D. Walter Fowler,
H. B. Applewhaite,

Inventor
Benj[a] Thompson
per Atty
A. H. Evans & Co.

UNITED STATES PATENT OFFICE.

BENJAMIN THOMPSON, OF BUFFALO, NEW YORK.

CONDENSER FOR TELEGRAPHIC CIRCUITS.

SPECIFICATION forming part of Letters Patent No. 268,317, dated November 28, 1882.

Application filed May 12, 1882. (No model.)

*To all whom it may concern:*

Be it known that I, BENJAMIN THOMPSON, of Buffalo, New York, have invented certain new and useful Improvements in the Application of Condensers to Telegraphic Circuits, of which the following is a specification.

The object of my invention is to eliminate the disturbing effects upon the home relay of a duplex or quadruplex telegraph that are attendant upon the static charge and discharge of the main line.

It is well known, in the operation of a duplex or quadruplex telegraph, that when the transmitting-key is first closed to put the main battery to line more current will at first flow to the main line than will flow through the artificial line, and the consequence is a momentary want of balance between the two circuits and a false signal upon the home sounder. This disturbance, which is but momentary, is well understood to be due to the difference in what is known as "static" or "charge" capacity of the main line and the artificial line. A similar disturbance occurs when the main-line battery is withdrawn and the main line put to earth, the static discharge from line then flowing back to earth through the key and through the equating-circuit in such a way as to produce a false signal.

The object of my invention is, by a novel arrangement of a condenser, to eliminate these disturbances and to effect the result with a condenser of comparatively small capacity.

My invention consists in interposing between the main and artificial lines a condenser whose two poles are connected respectively to said lines at points of different potential, the potential at the point of connection to the artificial line being greater than the potential at the point of connection of the condenser to the main line. The effect of this is to give to the artificial line a greater static or charge capacity than belongs to it naturally, and, by a suitable adjustment of the potential at the points of connection of the two poles of the condenser, to make the static or charge capacity of the main-line coil and the artificial line, so far as concerns the relay, approximately equal, so that no disturbance accompanies the placing of the battery to line. An additional effect, by reason of the difference in potential of the two points of connection, is to cause the condenser to accumulate upon the artificial-line side a static charge, which, when the main-line battery is withdrawn, discharges and circulates through the equating-coil and neutralizes the static discharge-current from the line. The line side of the condenser also forms a reservoir to receive a portion of the static discharge from line, which is diverted into the same by the artificial resistance placed in the line to produce the necessary difference in the potential of the main line and the artificial line at the points of connection of the condenser. By this action the disturbing effects of the static discharge are eliminated.

Having described the general principles of my invention, I will proceed to describe specifically, with reference to a diagram of the apparatus and connections, a method of carrying the same into practice.

Figure 2:
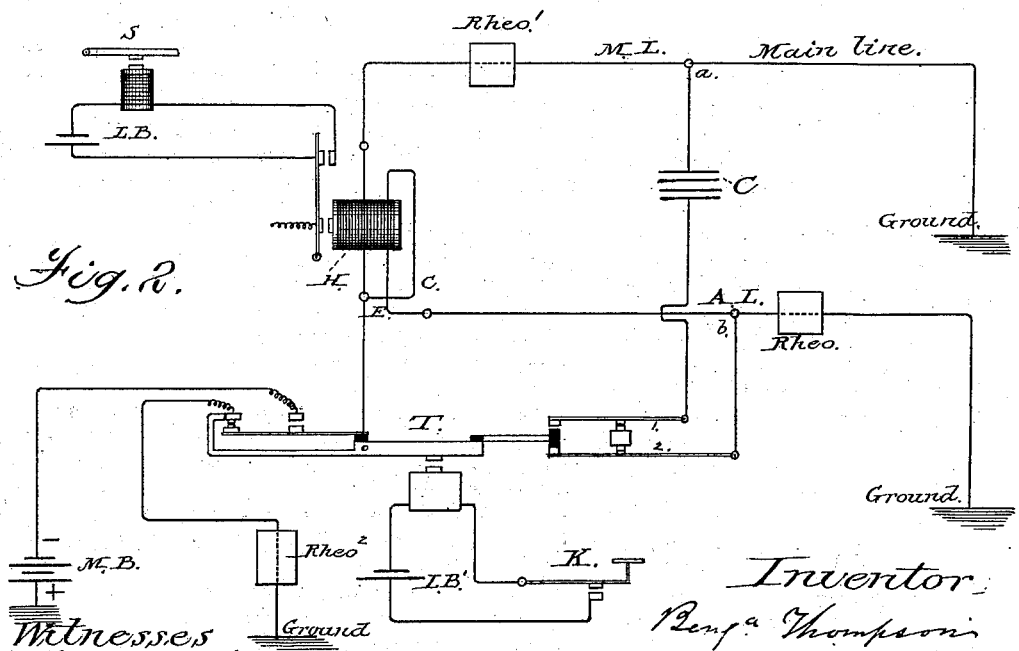

Figure 1 is such a diagram. Fig. 2 is a diagram of a modification.

Referring to Fig. 1, H is the differentially-wound relay of an ordinary duplex telegraph, the equating-coils of which relay are indicated at E C, and are connected to the artificial line A L, containing an adjustable resistance, Rheo, the function of which in balancing the resistances of the artificial and main lines is well understood.

L, B, and S are respectively the local battery and sounder of the relay H, while T indicates the duplex transmitter controlled by a local electro-magnet, the operating local battery and key for which are indicated at L B' and K.

M B is the main battery, normally disconnected from line, and Rheo² is the artificial resistance connected to the back contact of the transmitter between said transmitter and ground, and approximately equal to the resistance of the battery. C indicates the condenser for neutralizing the effects of the static charge and discharge. One pole of said condenser is connected to the artificial line at the point $b$ and the other at the point $a$ of the main line. To secure the desired difference of potential of these points, an adjustable artificial resistance, Rheo', is employed, the effect of which, in the position shown, is, as will be readily understood, to cause the potential at the point $a$ to be less than the potential at the point $b$. As a consequence, when the main-line battery M B is put to line the artificial-line side of the condenser acquires a positive charge, which, when the battery is withdrawn, flows through the equating-coils E C and neutralizes the static discharge from the line. By reason of the fact that the artificial-line side of the condenser is nearer the main-line battery in point of resistance than is the main-line side, the artificial or equating-coil circuit is made to approach in static or charge capacity the static capacity of the line-coil, and by a proper adjustment of the relative resistance of the circuits from battery to $a$ and from the battery to $b$, or, what is the same thing, by a proper adjustment of the relative potential of the points $a$ and $b$, which is accomplished by means of the artificial resistance Rheo', the effects of the static charge may be eliminated. The same adjustment of course also affects the amount of charge of the condenser and the consequent amount of discharge to neutralize the effects of the static discharge from the main line.

The operation of the condenser will be readily understood from what has been already said, and may be summarized as follows: When the battery M B is put to line the amounts of current that flow at the beginning of the signal in the main-line coils and in the artificial-line coils of the relay are approximately equal, the artificial-line side of the condenser, which is nearer the main-line side, acting more readily to absorb current and giving to the artificial line a static capacity which balances that of the main line. At the same time, by reason of the difference in potential of the points $a$ and $b$, the condenser is charged, and when the static discharge of the main line takes place the discharge from the condenser neutralizes its effects in a well-known way. A portion of the static discharge from the main line is also absorbed by the line side of the condenser, its diversion from the main-line coil of the relay H and its absorption being helped by reason of the presence of the resistance Rheo' between the point $a$ and the relay.

Any suitable means or any suitable arrangement of the apparatus may be employed for producing the difference of potential at the points of connection of the two sides of the condenser to the main and artificial lines, respectively.

In Fig. 2 is shown an arrangement in which the condenser is interposed momentarily only between the main and artificial lines at the times when its action, as above described, is desired. In this case the transmitter T controls two spring-contacts, 1 and 2, which are connected in the condenser branch, and which, when they simultaneously make contact with their interposed stop, complete the circuit between the artificial-line side of the condenser and the artificial line. They might obviously be used as well to complete the circuit of the main-line side. The springs 1 2 are controlled by an extension from the transmitter-lever T playing between them. As will be obvious, when the transmitter T is at rest the spring 1 is disconnected and the condenser-circuit is broken. When the transmitter is operated the points 1 and 2 momentarily make contact together with their intermediate stop, so as to connect the condenser to the artificial line. Immediately after the simultaneous contact of the springs the spring 2 is withdrawn and the condenser is disconnected, the latter holding its charge, however, ready for the return movement of the transmitter T. When the latter movement takes place the spring 2 comes into contact with its stop at the instant before the stop 1 is withdrawn, and the discharge from the condenser thereupon acts in the manner before explained.

In the arrangement of condenser herein described both sides thereof are fully and effectively utilized.

What I claim as my invention is—

1. The combination, with a duplex or quadruplex telegraph receiver, of a condenser whose sides are connected to the main and artificial lines, respectively, at points of different potential.

2. The combination, with a differentially-wound duplex or quadruplex telegraph receiver, of a condenser whose two sides are connected respectively to the main and artificial lines, the point of connection to the latter being of the greater potential.

3. The combination of the main and artificial lines, the condenser interposed between them, and the adjustable resistance Rheo' in the main line between the receiver and the point of connection of the condenser.

4. The combination of the differential relay H, resistance Rheo', and condenser C, one side of which is connected to the main line at a point, $a$, and the other to the artificial line at a point, $b$, of greater potential than the point $a$.

BENJAMIN THOMPSON.

Witnesses:
GEO. O. M. BUCKNER,
JAS. SWEENEY.